Figure 1:
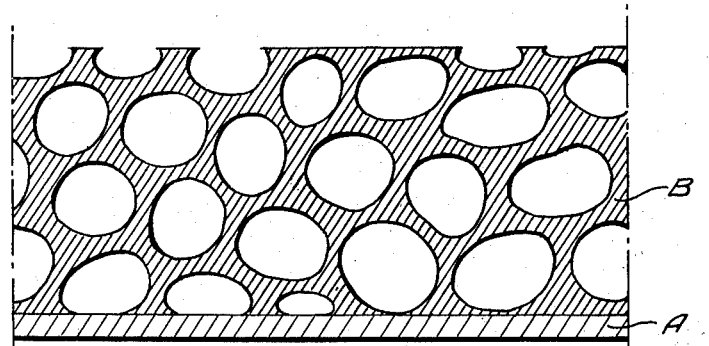
Figure 2:
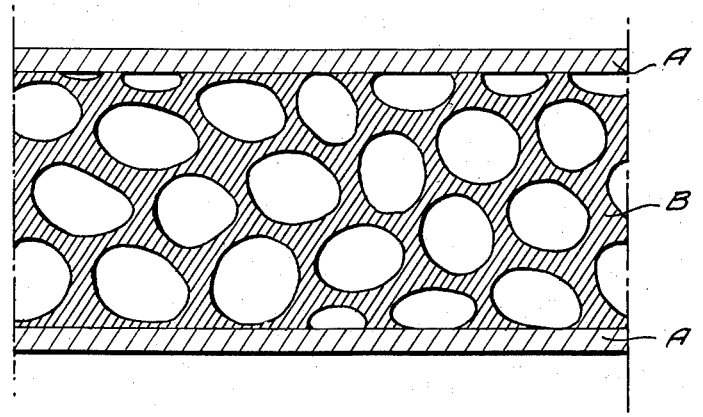
Figure 3:
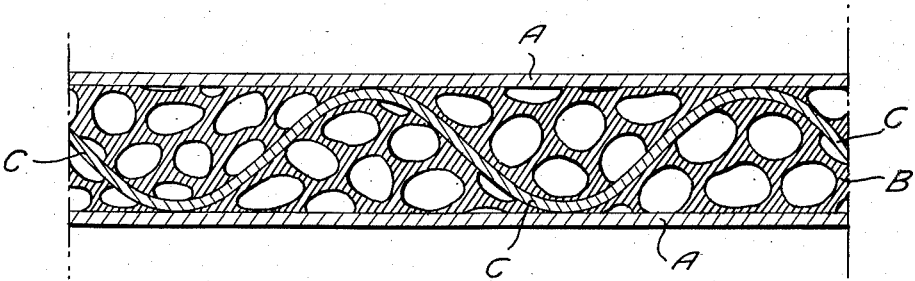

Nov. 20, 1951 E. L. KROPA ET AL 2,576,073
FABRICATED STRUCTURE COMPRISING
POROUS COMPOSITIONS OF MATTER
Filed Jan. 19, 1946

INVENTORS
EDWARD L. KROPA,
LOUIS E. CRAIG,
ARTHUR S. NYQUIST,
BY
Elizabeth Ann Krider
AGENT.

Patented Nov. 20, 1951

2,576,073

UNITED STATES PATENT OFFICE 2,576,073

FABRICATED STRUCTURE COMPRISING POROUS COMPOSITIONS OF MATTER

Edward L. Kropa, Old Greenwich, Louis E. Craig, Stamford, and Arthur S. Nyquist, Cos Cob, Conn., assignors to American Cyanamid Company, New York, N. Y., a corporation of Maine Application January 19, 1946, Serial No. 642,392

2 Claims. (Cl. 154—128)

This invention relates to resinous compositions. More particularly, it relates to fabricated structures fashioned of substantially water-insoluble, expanded, porous resins.

In many applications, such as for example in the aircraft industry, a structural material combining both lightness and strength is desirable. A resin which cures by polymerization has most suitable mechanical, electrical, physical and thermal properties, so we have attempted to produce a porous and consequently light-weight polymerized material which retains its strength and other excellent properties in spite of its porosity and which is suited for fabrication into structural shapes.

Several methods attempted have been unsuccessful. To prepare expanded materials by mechanical means, an unsaturated polymerizable material was intimately mixed with a gas by means of a high speed mixer and then gelled. It was found, however, that the gels were not sufficiently stable at the temperature necessary to effect a cure. Another method consisted in applying a gas which is absorbed or adsorbed by a particular unsaturated polymerizable material to that material at elevated pressure. When the pressure was released, the absorbed or adsorbed gas should have expanded the polymerizable material which might then have set in the expanded condition. However, we found that, in general, the polymerizable material did not retain the gas to any great extent.

The invention described and claimed in our copending application Serial No. 642,391 filed January 19, 1946, refiled as Serial No. 63,632 on December 4, 1948, and now Patent No. 2,498,621 dated February 21, 1950, takes advantage of the fact that in the initial stage the polymerizable material is liquid. It is therefore possible to readily introduce a gas-liberating material into the liquid. On subsequent heating the gas-liberating substance is decomposed, the resin sets, and the gas is entrapped in the cured mass.

It is an object of the present invention to produce structural materials comprising the porous cured resins described and claimed in the above-referred-to copending application.

It is another object of the present invention to produce light-weight resinous materials of high strength.

It is a further object of the present invention to produce a structural shape from an expanded porous resin which has been prepared by chemical means.

Still another object of the present invention is the production of fabricated light-weight structural material having an interlayer of expanded plastic material of low-density.

These and other objects are attained by assembling a fabricated structure having at least one surface sheet and adherent thereto a heat-cured mixture including a polymerizable unsaturated alkyd resin, a liquid having a boiling point of at least 100° C. and containing a $CH_2=C<$ group, and a gas-liberating material. A polymerization inhibitor and/or polymerization catalyst may be added to the polymerizable mixture before heating if desired.

The present invention may be more clearly understood by reference to the accompanying drawing. The various figures of the drawing represent vertical cross sections of structural panels assembled according to our invention. In the figures, A represents a surface sheet, B a porous low-density material, and C a re-enforcing strip.

Fig. I represents a fabricated structure with a single surface sheet;

Fig. II represents a fabricated structure with two surface sheets; and

Fig. III represents a re-enforced structure of the type shown in Fig. II.

The surface sheets of Figs. I, II and III and the re-enforcing strips of Fig. III may be of any suitable material preferably, but not necessarily, rigid and stiff. It may, for example, comprise a sheet of metal, metal foil or metal screening; a ply or plies of wood; a sheet of hardened resin; wood, metal or a fabric such as glass cloth which has been impregnated with resin and the resin then cured; laminates of wood, paper, fabric, etc., with resin adhesives such as phenolic, urea, melamine and other hardening resins, etc.

Selection of the particular material for surface sheets or re-enforcing strips is governed by the particular use to which the finished structure is to be put. If a somewhat flexible panel is desired, metal screening or metal foil are well suited for use as surface sheets. If a panel of the re-enforced type is to be used for insulation purposes, the re-enforcing strip should be selected from the non-conducting materials such as wood plies, resin sheets, etc.

The porous low-density material comprises essentially a low-density resin obtained by polymerizing a homogeneous mixture of a polymerizable unsaturated alkyd resin, a liquid having a boiling point of at least 100° C. and containing a $CH_2=C<$ group, and a gas-liberating material. If desired, a panel of the above described foamed resin may be affixed to surface sheets as a unit. It is more desirable, however, to grind a portion of the foamed resin and mix it with an additional portion of a polymerizable resinous composition so that the ground resin acts as a low-density filler. This mixture may then be polymerized in situ between suitable surface sheets.

Furthermore, if it is desired, the ground foamed resin may be mixed with a homogeneous mixture including a polymerizable unsaturated alkyd resin, a liquid having a boiling point of at least 100° C. and containing a CH$_2$=C< group, and a gas-liberating material. This polymerizable mixture is then cured in situ between suitable surface sheets.

The following examples, the proportions of which are given in parts by weight, are merely illustrative. It is not intended that they should be construed as limiting the scope of the invention to the specific details set forth.

Example 1

A polymerizable composition is prepared by bringing together two parts of an alkyd resin prepared from 6.3 mols diethylene glycol, 5 mols fumaric acid and 1 mol sebacic acid with one part of styrene in the presence of 0.1% by weight of hydroquinone and .004% by weight of cobalt added as cobalt naphthenate, in accordance with the procedural details set out in U. S. applications Serial No. 556,082 filed September 27, 1944, now abandoned, and Serial No. 555,194 filed September 21, 1944 now Patent No. 2,443,741, issued January 22, 1948. To this solution 0.5% of benzoyl peroxide is added. 1.0 part of the diguanylurea salt of diazotized toluidine is dispersed in 200 parts of the above described polymerizable composition, and the resin solution so obtained is cured by heating at 140° C. for about 20 minutes.

As the diguanylurea salt of diazotized toluidine undergoes thermal decompositions, the resin solution gels. The continued evolution of gas due to diazo decomposition results in some of the gas being trapped in the gelled resin mass, thereby effecting a volume expansion of about 10–15%. The cured resin mass is soft and porous.

Example 2

To a series of four 100-part portions of the polymerizable composition of Example 1 are added, respectively, 0.5, 1, 2 and 5 parts of powdered ammonium bicarbonate.

The resin solutions are cured by heating at 100° C. for an hour. Volume expansions for the cured porous resins obtained are as follows:

| Per Cent Bicarbonate Added | Per Cent Volume Expansion |
|---|---|
| 0.5 | 75 |
| 1 | 117 |
| 2 | 131 |
| 5 | 234 |

Example 3

0.9 part of ammonium carbonate is dispersed in 90 parts of a resin solution consisting of 45 parts of an alkyd resin made from 4 mols ethylene glycol, 3 mols sebacic acid, 1 mol fumaric acid and 45 parts of styrene.

The resin solution is cured by heating at 100° C. for an hour during which operation it undergoes a volume expansion of approximately 50%. The resulting porous mass is soft and spongy.

Example 4

10 parts of finely powdered para-siopropenyl toluene polymer is added to 50 parts of the polymerizable resin composition described in Example 1. The mixture is stirred in the presence of powdered Dry Ice until the viscous mass is of smooth creamy consistency, numerous small bubbles of evolved carbon dioxide gas having been entrapped thereby.

1 part of very fine short glass fibers is added and dispersed by stirring with additional powdered Dry Ice until the dough-like mass is of uniform consistency.

The resulting mixture, when heated at 140° C. for an hour, undergoes a volume increase due to the expansion of the entrapped carbon dioxide and cures to a hard, porous mass of very good strength.

Example 5

1.5 parts of fine, short glass fibers and about 5 parts of powdered Dry Ice are added to 150 parts of the polymerizable composition of Example 1 containing 0.75 part of lauroyl peroxide in place of the benzoyl peroxide. The mixture is stirred thoroughly to disperse the glass fibers and entrap some of the carbon dioxide gass liberated as the Dry Ice decomposes.

A ¼-inch thick sheet of the resulting mixture is cast and cured by permitting it to stand at 20° C. for about 16 hours and then heating it for 2 hours at 100° C. The cast sheet has a density of approximately 0.68, indicating a fairly good degree of porosity, and a dielectric constant of 2.8 at $10^6$ cycles.

Example 6

7.5 parts of powdered ammonium bicarbonate are added to and well dispersed in 750 parts of the polymerizable composition of Example 1 containing 3.75 parts of lauroyl peroxide instead of benzoyl peroxide.

Upon curing by heating at 100° C. for an hour in an open vessel, the resin undergoes a volume expansion of approximately 140% to give a fairly hard, porous mass.

Example 7

A polymerizable composition is prepared by bringing together 10 parts of diallyl phthalate, 15 parts of an alkyd resin prepared from 6 mols of diethylene glycol, 5 mols of fumaric acid, and 1 mol of sebacic acid, and 0.1–0.2 part benzoyl peroxide. 1 part ammonium bicarbonate is dispersed in 100 parts of the above composition and the resin is cured by heating at 100° C. for an hour, undergoing in the process a volume expansion of 80%.

Example 8

A mixture of 20 parts of the alkyd resin prepared from 6 mols diethylene glycol, 5 mols fumaric acid and 1 mol sebacic acid, 10 parts bis allyl lactocarbonate and 0.15 part benzoyl peroxide is prepared. To 90 parts of this mixture is added 9 parts of ammonium bicarbonate. During curing by heating at 100° C. for an hour, the resin undergoes a volume expansion of 65%.

Example 9

15 parts of the alkyd resin prepared from 6 mols diethylene glycol, 5 mols fumaric acid and 1 mol sebacic acid are mixed with 8 parts of styrene and 0.1–0.2 part of lauroyl peroxide. 1 part of potassium carbonate is added, and the polymerizable composition is cured by heating about an hour at 100° C. A volume expansion of 65% is realized.

Example 10

Example 9 is repeated using guanidine carbonate in place of the potassium carbonate. The resin, on curing, undergoes a 36% volume expansion.

Example 11

30 parts of butylene glycol maleate, 15 parts of styrene and 0.5 part lauroyl peroxide are mixed. To the mixture is added 0.5 part of ammonium bicarbonate and the resin is cured by heating for an hour at 100° C., during which operation it undergoes a volume of 200%.

Example 12

2 parts of cellulose acetobutyrate are added to 100 parts of the polymerizable composition of Example 1 and the mixture is rolled for 24 hours. The viscosity of the resulting solution measured on a Brookfield Synchro-Lectric single speed (60 R. P. M.) viscosimeter is 18.64 poises.

50 parts of the above thickened solution is admixed with 2.5 parts of ammonium bicarbonate and 0.5% lauroyl peroxide and heated for one hour at 100° C. A uniform, hard foam is obtained which is characterized by a 430% volume increase over a foam from a similar but unthickened resin solution.

Example 13

3.5 parts of powdered ammonium bicarbonate are dispersed in 200 parts of the polymerization composition of Example 1 containing 3.5 parts of lauroyl peroxide.

Heating in a radio frequency field of 10–25 megacycles gives a volume expansion of well over 500%. The cured, very porous, fairly hard foam has a density of 0.082–0.089 g./cc.

Example 14

954 parts (9 mols) of diethylene glycol, 870 parts (7.5 mols) of fumaric acid, and 303 parts (1.5 mols) of sebacic acid are reacted at 170° C. to an acid number of 50. The resin is cooled to 160° C. and 82 parts of cellulose acetobutyrate (to give 3% by weight of resin) and 1.4 parts of p-tertiary butyl catechol are added. The mixture is stirred for 1½ hours until clear and then cooled to 50°–80° C.

916 parts of steam-distilled styrene is added and the solution stirred until it becomes clear. The solution has a viscosity, measured as in Example 12 of 64.5 poises at 25° C.

When foamed with 0.5% lauroyl peroxide and 5 parts of ammonium bicarbonate for every 50 parts of resin solution by heating at 100° C. for an hour, a 633% volume expansion is realized and the casting is hard and very porous.

Example 15

The porous mass obtained in Example 6 is broken up and comminuted in a rotary impact cutter. Microscopic examination of the granular product shows it to be cellular in structure.

75 parts of the granular, porous, cured resin are mixed in an inert atmosphere with 150 parts of the polymerizable composition of Example 1 containing 0.75 part of lauroyl peroxide. The viscous composition so obtained is cured as an interliner of approximately ⅛ inch thickness between two layers of glass cloth freshly impregnated with the polymerizable composition alone by heating for an hour at 100° C. between glass plates under a pressure of 0.5 p. s. i.

The resulting laminate has an approximate density of 1.08 and possesses good stiffness. The modulus of elasticity in bending is $0.68 \times 10^6$ pounds per square inch; the dielectric constant and power factor at $10^6$ cycles are 2.7 and 0.035, respectively.

Example 16

40 parts of the granular, porous, cured resin prepared as described in Example 6 and 0.5 part of ammonium bicarbonate are mixed under an inert atmosphere with 100 parts of a polymerizable mixture prepared in the proportion of 2 parts of an alkyd resin made from 6 mols diethylene glycol plus 5 mols fumaric acid plus 1 mol sebacic acid to 1 part of styrene and 0.5 part lauroyl peroxide.

The viscous composition so obtained is cured as an interliner between two layers of glass cloth freshly impregnated with the polymerizable mixture alone by heating at 100° C. for an hour between clamped glass plates.

The resulting panel has an approximate density of 0.91 and possesses good stiffness. The dielectric constant and power factor at $10^6$ cycles are 2.8 and 0.029, respectively.

Example 17

The surfaces of the foamed panel obtained in Example 6 are abraded and the panel then placed upon a ply of glass cloth impregnated with the polymerizable composition of Example 1. The system is weighted and cured for an hour in an oven at 100° C. The same procedure is repeated on the other surface.

Example 18

Glass cloth is impregnated with the polymerizable composition of Example 1. More of the same polymerizable composition is then foamed up between the rougher sides of the impregnated glass cloth plies and cured by heating in an oven at 100° C. for about an hour.

Example 19

Two sheets of tin are coated with a methyl ethyl ketone solution of an ethyl acrylate acrylamide copolymer and baked in an oven at 100° C. for a few minutes to remove the solvent. The polymerizable composition of Example 1 is foamed up between the tin sheets with the copolymer-coated sides next to the foam and after curing for an hour in an oven at 100° C. a unit is obtained in which the adhesion of resin foam to metal is good.

Example 20

2 parts of powdered ammonium bicarbonate are dispersed in 50 parts of the polymerization composition of Example 1 containing 0.25 part of lauroyl peroxide.

The polymerization composition is then foamed up between two pieces of bronze screen-wire held between two plates of glass. The screen-wire is attached rather firmly to the cured porous interliner which is produced to give a fairly stiff panel.

Among gas-liberating materials which can be used in the process of the present invention are solid diazo compounds such as diazoaminobenzene, diazoaminotoluene, diazodi-isobutyronitrile, diguanylurea salt of diazotized toluidine, other stabilized azo salts, etc., carbon dioxide, carbonates such as ammonium carbonate, potassium carbonate, sodium carbonate, and guanidine carbonate, and bicarbonates such as ammonium bicarbonate and sodium bicarbonate. In general, ammonium bicarbonate has been found to be particularly satisfactory as a foaming agent because it decomposes readily when heated, but other gas-liberating substances may also be used effectively. The particular selection depends somewhat upon the use to which the final product is to be put. For example, in order to obtain a porous, light-weight resin with good electrical characteristics, it is preferable to use a gas-liberating material which leaves no metallic residue upon decomposition. For such purposes, solid carbon dioxide or ammonium bicarbonate are excellent.

The unsaturated alkyd resins used in connection with the present invention should contain a plurality of alpha, beta-enal groups. The simplest members of this group are those produced by the esterification of an alpha, beta-unsaturated organic acid with a polyhydric alcohol.

The preferred polyhydric alcohols are those which contain only primary hydroxyl groups since the presence of secondary hydroxyl groups may make it difficult to obtain rapid esterification. The glycols are generally preferable. If colorless resins be desired, it is preferable to use glycols which do not have any oxygen bridges in their structure since the presence of oxygen linkages may lead to the formation of color bodies during the preparation of the resin. By the use of glycols which do not contain oxygen bridges clear colorless resins may be produced. On the other hand, oxygen bridges may be desirable if the resin is going to be exposed to air whereby the surfaces will dry faster.

The particular choice of glycol or other polyhydric alcohol used in preparing the resin is governed mainly by the physical properties desired of the intermediate and final polymerization products, especially hardness, impact resistance, distensibility, refractive index, adhesion, compatibility relationships, etc. including also solvent, water, alkali, acid or chemical resistance in general.

The alpha, beta unsaturated organic acids which we prefer to use in preparing the reactive resins include maleic, fumaric, itaconic and citraconic although other similar acids could be substituted such as mesaconic acid, aconitic acid and halogenated maleic acids such as chlormaleic acid and any of the foregoing could be substituted in part with acrylic, beta benzoylacrylic, methacrylic, 4¹-cyclohexene carboxylic, cinnamic, and crotonic acids. Obviously various mixtures of these acids can be used where expedient.

The reactive resins may be modified with other substances which are used in alkyd resins i. e. monohydric alcohols, monobasic acids or dibasic acids e. g. phthalic acid, sebacic acid, etc. which do not contain groups polymerizably reactive with respect to organic substances containing $CH_2=C<$ groups. These modifying agents are usually used as diluents or plasticizers, chemically combined with the resin.

The reactive resins may be prepared from polyhydric alcohols other than the glycols or from mixtures including a glycol and a higher polyhydric alcohol. Examples of these are glycerol, pentaerythritol, etc. Polyhydric alcohols containing more than two hydroxyl groups react very readily with the alpha, beta unsaturated organic acids. Consequently it may be preferable to use some monohydric alcohol in conjunction with the alcohols which contain more than two hydroxyl groups or else some monobasic acid may be used.

It is also possible to introduce initially into the resin structure a certain number of groupings of the type $CH_2=C<$ through the use of unsaturated alkyl compounds. One way of accomplishing this, for example, is by direct esterification of an unsaturated alcohol containing a $CH_2=C<$ group. Examples of such alcohols are allyl alcohol and methallyl alcohol.

While the reactive resins may be modified in the same general manner as other alkyd resins, it is preferable to have at least 20% polyhydric alcohol in the reactive mixture and at least 25% polybasic acid in said reactive mixture. If a monohydric alcohol or a dibasic acid which does not contain polymerizably active groups with respect to organic substances containing $CH_2=C<$ groups be used, the proportion of such substances will depend on the properties required of the polymerized reactive solvent-reactive resin mixture. By the use of a relatively large proportion of a polymerizably active dibasic acid, e. g. maleic, in the reactive resin, a hard, tough polymer is produced upon subsequent reaction of said reactive resin with a reactive solvent. On the other hand, if the reactive resin is obtained from a relatively small proportion of polymerizably active dibasic acid and a relatively large proportion of acids which do not contain groups polymerizably active with respect to organic substances containing $CH_2=C<$ groups, a softer and more rubbery resin results upon polymerization with a reactive solvent. The same effect is produced by the introduction of other inactive ingredients. By varying the ingredients and the proportions of the ingredients, resins may be obtained having properties desirable for almost any particular use.

If it be desirable to introduce lower alkyl groups into the resin, this may be done by using maleic esters of monohydric alcohols, e. g. ethyl maleate. The alkyl ester will then be united with the resin by polymerization. This could not be accomplished with the saturated type of alkyd, e. g. phthalic acid esters of polyhydric alcohols.

Among the liquids having a boiling point of at least 100° C. and containing a $CH_2=C<$ group which are suitable for use according to the present invention are styrene, substituted styrenes such as methyl styrenes, i. e., α-methyl styrene, o-methyl and p-methyl styrenes, dimethyl styrenes, i. e., α-p-dimethyl styrene, 2,3-dimethyl styrene, 2,4-dimethyl styrene, 2,5-dimethyl styrene, 2,6-dimethyl styrene, α-methyl-2,4-dimethyl styrene, α-methyl-2,5-dimethyl styrene, α-methyl-2,3-dimethyl styrene, chloro styrenes, chloromethyl styrenes, ethyl styrenes, methyl ethyl styrene, isopropyl styrenes, etc., suitable vinyl esters, and suitable esters of acrylic acid and methacrylic acid.

Also useful are allyl esters such as diallyl fumarate, diallyl maleate, diallyl phthalate, diallyl succinate, allyl acetate, allyl lactate, the allyl ester of α-hydroxyisobutyric acid, diallyl malonate, diallyl carbonate, diallyl oxalate, diallyl adipate, diallyl sebacate, diallyl itaconate, triallyl tricarballylate, triallyl citrate, triallyl phosphate, tetrallyl silicate, allyl alcohol, methallyl alcohol, etc.

The polymerization catalysts which may be used in conjunction with the mixture of unsaturated alkyd resin and liquid containing a $CH_2=C<$ group include the organic superoxides, aldehydic and acidic peroxides. Among the preferred catalysts are: the acidic peroxides, e. g., benzoyl peroxide, phthalic peroxide, succinic peroxide and benzoyl acetic peroxide; fatty oil acid peroxides, e. g. coconut oil acid peroxides, stearic peroxide and oleic peroxide; alcohol peroxides, e. g. tertiary butyl hydroperoxide; and di-tertiary butyl peroxide; and terpene oxides, e. g. ascaridole. Other polymerization catalysts such as soluble cobalt salts (particularly the linoleate and naphthenate), p-toluene sulfonic acid, aluminum chloride, stannic chloride, boron trifluoride, etc., may also be used.

The concentration of catalyst employed is usually small, i. e. for the preferred catalysts from about one part of catalyst per thousand parts of the polymerizable mixture to about two parts of catalyst per hundred parts of the mixture. If an inhibitor be present, up to 5% or even more of catalyst may be necessary according to the concentration of inhibitor.

When it is advisable either to stabilize the polymerizable mixture against storage or to control an extremely rapid polymerization, a polymerization inhibitor is included in the reaction mixture. This inhibitor is preferably a phenolic compound, especially of di- and polyhydroxy phenols, or an aromatic amine such as hydroquinone, resorcinol, tertiary butyl catechol, tannin, sym. alpha, beta-naphthyl-p-phenylene diamine, phenolic resins, etc. Sulfur compounds are also suitable as are benzaldehyde and l-ascorbic acid.

The particular unsaturated alkyd resin, liquid having a boiling point of at least 100° C. and containing a $CH_2=C<$ group, polymerization catalyst and polymerization inhibitor to be used are selected according to the type of product desired, taking into account the solubilities of the reactants as well as the character of the resulting gels. Some combinations, for instance, result in opaque gels while others give clear products in the gel state. Obviously, an opaque gel may be used equally as well as a clear gel for many purposes.

Various solid materials may be introduced into the resinous solution of the present invention before the porous structure is made. In order to increase the viscosity of the resin solution by so-called "mechanical" means, short fibrous materials such as asbestos, wood flour, glass, cotton, mica, scrap cork, etc. may be incorporated in the solution. We prefer, however, to utilize an organic material such as cellulose acetobutyrate which becomes dispersed in the resin and forms solutions of extremely high viscosity. Incorporation of 1–3% cellulose acetobutyrate in the solution produces foams of outstanding characteristics. Other dispersible resins which may be employed are poly butylacrylate and poly vinyl acetate.

In order to increase strength, materials such as fine glass filaments (obtained by hammer-milling) and insoluble, thermoplastic resinous materials in solid or filament form including polymers of isopropenyl toluene, polymers of acrylonitrile, alpha cellulose pulp and the like may be added to the soluble resin composition.

While satisfactory low-density resins are obtained when the polymerizable compositions are foamed at atmospheric pressure, we have found that a larger percentage volume increase takes place when the foaming is carried out under reduced pressure. The advantage of this volume increase is at least partially offset by the increased size of the pores in the resin structure and by the loss of a considerable amount of the liquid containing a $CH_2=C<$ group.

It is possible to prepare, by the process of the present invention, resins of good mechanical, electrical and other characteristics having a density as low as 0.1 gram per cc. of resin. In general, the resins of the invention have densities ranging from 0.1–0.7 gram per cc. of resin.

The expanded, porous, lightweight resins of the present invention have many uses. One important application is in heat and sound insulating material where the resins may be formed in situ or may be used as pre-formed blocks. Fabricated structures in the form of laminates with the resinous compositions of the present invention as fillers have found wide application in the aircraft and other industries interested in fabricated parts embodying both lightness and strength. In such applications the filler must have as low a density as possible but at the same time, sufficient crushing and shear strength to make the whole act as a structural unit. For example, laminates embodying the lightweight resins of the present invention may be used in airplane cabin partitions, trim tabs, wing edges, fuselage panels, and other structural applications.

Another important application of our porous, lightweight fabricated structures is their use in the formation of structural domes suitable for housing high frequenecy electrical devices such as, for example, radar.

We claim:

1. A process of making a fabricated structure having surface sheets and a resinous interlayer which comprises the steps of (1) mixing (a) ground, expanded, porous, low density, cellular, cured, water-insoluble resin obtained by polymerizing a homogeneous mixture including an unsaturated alkyd resin, a material selected from the group consisting of styrene and esters of allyl alcohol and a gas-liberating agent with (b) a polymerizable mixture including an unsaturated alkyd resin and a material selected from the group consisting of styrene and esters of allyl alcohol and (2) polymerizing the resultant mixture in situ between surface sheets impregnated with a polymerizable composition, both of said alkyd resins having been prepared by the esterification of an alpha, beta unsaturated dicarboxylic acid and a polyhydric alcohol.

2. A process according to claim 1 in which the surface sheets are glass cloth impregnated with a polymerizable mixture including an unsaturated alkyd resin prepared by the esterification of an alpha, beta unsaturated dicarboxylic acid with a polyhydric alcohol and a material selected from the group consisting of styrene and esters of allyl alcohol.

EDWARD L. KROPA.
LOUIS E. CRAIG.
ARTHUR S. NYQUIST.

REFERENCES CITED

The following references are of record in the file of this patent:

UNITED STATES PATENTS

| Number | Name | Date |
|---|---|---|
| 1,798,609 | Knowlton | Mar. 31, 1931 |
| 2,158,033 | McKinney | May 9, 1939 |
| 2,186,793 | Wodtke | Jan. 9, 1940 |
| 2,218,474 | Moore | Oct. 15, 1940 |
| 2,375,960 | Stoops | May 15, 1945 |
| 2,376,653 | Boyer | May 22, 1945 |
| 2,381,631 | Waring | Aug. 7, 1945 |
| 2,388,319 | Fuller | Nov. 6, 1945 |
| 2,414,125 | Rheinfrank | Jan. 14, 1947 |
| 2,461,761 | Nye | Feb. 15, 1949 |

OTHER REFERENCES

"Modern Plastics," article on "Cellular Plastics," published Sept. 1944, pages 133–139, 170 and 172.